United States Patent [19]
Kanemori et al.

[11] Patent Number: 5,508,591
[45] Date of Patent: Apr. 16, 1996

[54] ACTIVE MATRIX DISPLAY DEVICE

[75] Inventors: Yuzuru Kanemori, Tenri; Mikio Katayama, Ikoma; Kiyoshi Nakazawa, Fujiidera; Naofumi Kondo, Nara; Masaya Okamoto, Nara; Hiroaki Kato, Nara; Kozo Yano, Yamatokoriyama; Katsumi Irie, Gojo; Kumiko Otsu, Osaka; Hiroshi Fujiki, Sakai; Toshiaki Fujihara, Tenri; Hideji Marumoto, Kashiba; Hidenori Negoto, Ikoma; Kazuyori Mitsumoto, Tenri, all of Japan

[73] Assignee: Sharp Kabushiki Kaisha, Osaka, Japan

[21] Appl. No.: 46,854

[22] Filed: Apr. 15, 1993

Related U.S. Application Data

[63] Continuation-in-part of Ser. No. 706,974, May 29, 1991, abandoned.

[51] Int. Cl.$^6$ .................................................. G09G 3/10
[52] U.S. Cl. ................................. 315/169.3; 315/169.4; 359/59
[58] Field of Search .................................. 359/55, 59, 87; 313/583; 315/169.3, 169.4

[56] References Cited

U.S. PATENT DOCUMENTS

| | | | |
|---|---|---|---|
| 4,890,097 | 12/1989 | Yamashita et al. | 340/719 |
| 5,076,666 | 12/1991 | Katayama et al. | 359/59 |
| 5,102,361 | 4/1992 | Katayama et al. | 445/4 |

FOREIGN PATENT DOCUMENTS

| | | |
|---|---|---|
| 0288011 | 10/1988 | European Pat. Off. . |
| 58-021863 | 7/1983 | Japan . |
| 59-101693 | 6/1984 | Japan . |
| 62022455 | 6/1987 | Japan . |
| 01048037 | 6/1989 | Japan . |
| 8705141 | 8/1987 | WIPO . |

OTHER PUBLICATIONS

Patent Abstracts of Japan, vol. 11, No. 195 (E–518), 23 Jun. 1987, & JP–A–6202245 (Asahi Glass Co.).
Patent Abstracts of Japan, vol. 13, No. 245 (P–881), 8 Jun. 1989 & JP–A–01048037 (Matsushita).
Patent Abstracts of Japan, vol. 7, No. 99 (E–172) (1244), 11 Jul. 1983, & JP–A–58021863 (Suwa Seikosha).
Proceedings of the S.I.D. vol. 26, No. 3, 1985, pp. 201–207, Hartsdale, New York, US; S. Bisotta et al.: "Using Redundancy When Designing Active–Matrix–Addressed LCDs" pp. 201–203.
Conference Record of the 1985 International Display Research Conference 15–17 Oct. 1985, pp. 27–29, San Diego, CA, US; T. Saito et al.: "A High Picture Quality LC–TV Using Triangle Trio–Color Dots Addressed By Si TFTs" (whole document).
Proceedings of the S.I.D. vol. 29, No. 3, 1988, pp. 217–220, New York, US; K. Oki et al.: "A New Active–Matrix LCD Architecture for Larger-Size Flat Displays".

*Primary Examiner*—Robert J. Pascal
*Assistant Examiner*—Michael Shingleton
*Attorney, Agent, or Firm*—Nixon & Vanderhye

[57] ABSTRACT

An active display device, comprising: a plurality of source buses and a plurality of gate buses; a plurality of pixel electrodes, said pixel electrodes each having associated therewith a switching element for delivering a drive signal to said pixel electrode from at least one of said source buses as a function of a signal provided by at least one of said gate buses; and means other than said switching elements for selectively electrically connecting at least one of said pixel electrodes to a corresponding one of said source buses in the event said at least one pixel electrode is considered to be defective.

14 Claims, 19 Drawing Sheets

ACTIVE MATRIX DISPLAY DEVICE

CROSS REFERENCE TO RELATED APPLICATION

This is a continuation-in-part of application Ser. No. 07/706,974 filed May 29, 1991, now abandoned.

BACKGROUND OF THE INVENTION

1. Field of the Invention

The present invention relates generally to an active matrix display device, and more particularly to an active matrix display device in which switching elements such as thin film transistors apply drive signals to pixel electrodes arranged in a matrix so as to achieve a high density display.

2. Description of the Related Art

In the known liquid crystal display devices, EL display devices, plasma display devices, etc. the pixel electrodes arranged in a matrix are selectively driven so as to represent a pattern on a screen. The pixel electrodes are individually provided with switching elements through which the pixel electrodes are selectively driven. This is commonly called an active matrix driving system. The switching elements are made of a thin film transistor (TFT), a metal-insulator metal (MIM), a MOS transistor, a diode and a varistor. A voltage applied between the individual pixel electrodes and counter electrodes is switched on, and a liquid crystal, an EL light emitting medium, a plasma light emitting device, or the like make the display medium optically modulated. The optical modulation is observed as displayed patterns by the naked eye. The active matrix display device is suitable for display in high contrast, and finds application in liquid crystal television, word processors, and terminal display units of computers.

FIGS. 9 and 10 show in relevant portion known types of active matrix liquid crystal display devices. One of a pair of substrates has gate buses 21 arranged transversely and source buses 23 perpendicular to the gate buses 21. Every rectangular segment enclosed by the adjacent gate buses 21 and the source buses 23 has a pixel electrode 41.

A gate bus branch 22 branched off from the gate bus 21 has a TFT 31 as a switching element. The gate bus branch 22 includes a first section 22a which functions as a gate electrode for the TFT 31, and a second section 22b which is narrower than the first section. A drain electrode 33 of the TFT 31 is electrically connected to the pixel electrodes 41, and a source electrode 32 is connected to the source bus 23.

FIG. 10 shows another known example in which a source bus branch 90 branched from the source bus 23 overlaps the gate bus 21, and a TFT 31 is formed on the overlapping part. A drain electrode 33 of the TFT 31 is electrically connected to the pixel electrodes 41, and a source electrode 32 is electrically connected to the source bus 23 through the source bus branch 90.

Under this arrangement of the known active matrix display device a problem arises, for example, if any switching element malfunctions, the pixel electrode connected thereto receives no signal. This appears on the display as devoid of a pixel electrode. The absence of a pixel electrode spoils the representation of the display device. This results in a lower manufacturing yield.

Such faulty or defective pixel electrodes occur for the following two reasons:

(1) The pixel electrodes are not fully charged until the switching elements are selected by a scanning signal (signals from the gate bus)(hereinafter referred to as "on fault"), and (2) An electric leakage occurs through the charged pixel electrodes before the switching elements are selected (hereinafter referred to "off fault").

The "on fault" occurs owing to a defective switching element. The "off fault" occurs for a further two reasons; one is an electrical leakage through the switching element, and the other is an electrical leakage between the pixel electrodes and the buses. In either case, the voltage to be applied between the pixel electrodes and the counter electrode does not reach a required value. This causes faulty pixel electrodes to look like luminous points under the normal white mode (a mode in which the optical transmissibility reaches the maximum when the voltage applied to the liquid crystal is zero), and looks like a black point under the normal black mode (a mode in which the transmissibility is lowest when the voltage reaches zero).

If these faults are found during the fabrication of a substrate in which the switching elements are arranged, they can be trimmed using a laser. In fact, however, it is almost impossible to identify during fabrication a single faulty pixel electrode in a great number of pixel electrodes. The mass production of substrates cannot be carried out without increasing costs and prolonging the time. It is completely impossible to do so in a large size display panel having 100,000 to 500,000 pixel electrodes.

It is possible to visually observe a faulty pixel electrode by overlaying a counter substrate on a substrate in question, injecting liquid crystal therebetween and applying an inspection signal to the source bus. This method requires a correction in which the source bus and the pixel electrodes are short-circuited so as to effect the charge and discharge of the pixel electrodes by a signal voltage irrespective of whether the source bus was selected or not. In the example shown in FIGS. 9 and 10, it is inherently difficult to do such a correction because of the arrangement of the source bus 23 and the pixel electrodes 41. After all, the display device containing the faulty pixel electrodes has to be discarded even if other components and elements are in good condition. This is wasteful, and increases the production cost. This accounts for the decreased manufacturing yield.

SUMMARY OF THE INVENTION

The active matrix display device of this invention, which overcomes the above-discussed and numerous other disadvantages and deficiencies of the prior art, comprises a first insulating substrate and a second insulating substrate, a gate bus and a source bus arranged on the first insulating substrate in the form of a lattice, a pixel electrode arranged in a segment enclosed by the gate bus and the source bus, a switching element connected to the pixel electrode, a part of the pixel electrode being overlaid on an adjacent gate bus so as to form an additive capacitance together with the gate bus with an insulating layer sandwiched therebetween, wherein the source bus is provided with a projection extending toward the pixel electrode in such a manner as to be electrically disconnected from the pixel electrode, and the gate bus being provided with a projection extending toward the pixel electrode, and the source bus being overlaid on the gate bus projection through an insulating layer, the gate bus projection being provided with an electroconductive member, the electroconductive member being electrically connected to the pixel electrode and electrically disconnected from the source bus projection.

Alternatively, an active matrix display device is provided comprising a first insulating substrate and a second insulating substrate, a gate bus and a source bus arranged on the first insulating substrate in the form of a lattice, a pixel electrode arranged in a segment enclosed by the gate bus and the source bus, switching elements connected to the pixel electrode, gate bus and the source bus, wherein the source bus comprises a projection extending toward the pixel electrode in such a manner as to be electrically disconnected from the pixel electrode, and the gate bus comprises a projection extending toward the pixel electrode and whose top end reaches toward a forward end of the source bus projection, the switching element being formed toward the base end of the gate bus projection, a middle portion of the gate bus projection being overlapped by the source bus projection with an insulating layer sandwiched therebetween, the gate bus projection being provided with an electroconductive member at the top thereof through an insulating layer, the electroconductive member being electrically connected to the pixel electrode.

In another embodiment, an active matrix display device is provided comprising a first insulating substrate and a second insulating substrate, a gate bus and a source bus arranged on the first insulating substrate in the form of a lattice, a pixel electrode arranged in a segment enclosed by the gate bus and the source bus, switching elements connected to the pixel electrode, gate bus and the source bus, wherein the source bus comprises a projection extending toward the pixel electrode in such a manner as to be electrically disconnected from the pixel electrode, and the gate bus comprises a projection extending toward the pixel electrode and whose top end reaches toward a forward end of the source bus projection, the switching element being formed toward the base end of the gate bus projection, a middle portion of the gate bus projection being overlaid on the source bus projection with an insulating layer sandwiched therebetween, the gate bus projection being provided with an electroconductive member at the top thereof through an insulating layer, the electroconductive member being electrically connected to the pixel electrode.

In still another embodiment, an active display device is provided comprising a plurality of source buses and a plurality of gate buses; a plurality of pixel electrodes, said pixel electrodes each having associated therewith a switching element for delivering a drive signal to said pixel electrode from at least one of said source buses as a function of a signal provided by at least one of said gate buses; and means other than said switching elements for selectively electrically connecting at least one of said pixel electrodes to a corresponding one of said source buses in the event said at least one pixel electrode is considered to be defective.

Thus, the invention described herein makes possible the objectives of (1) providing an active matrix display device in which one can detect and correct any faulty pixel electrodes by a simple procedure after all pixel electrodes are driven, (2) providing an active matrix display device which can be produced at low costs with a high manufacturing yield, and (3) providing an active matrix display device in which one can correct any faulty pixel electrodes without reducing the aperture ratio of the display panel.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
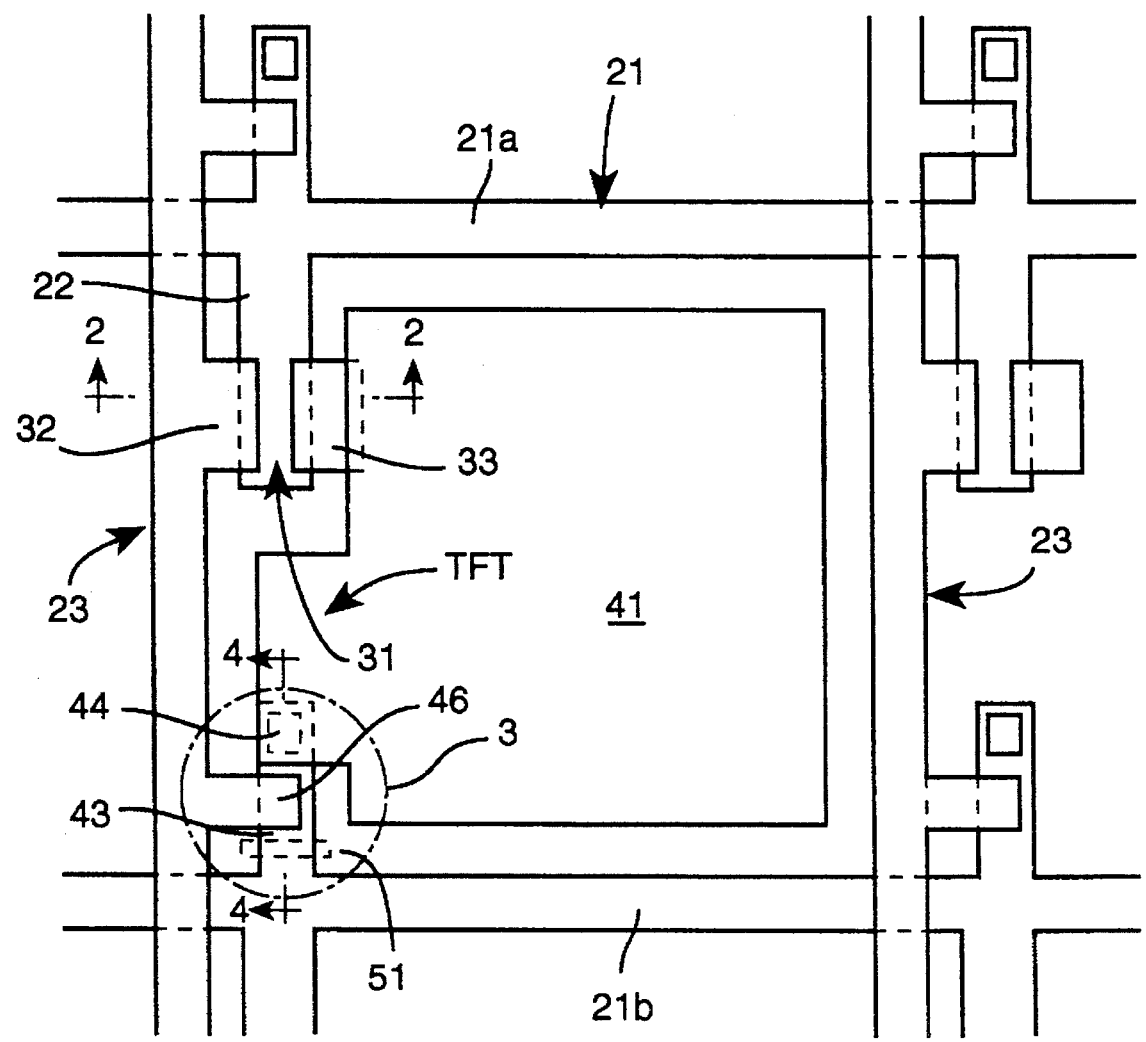
FIG. 1 is a plan view showing an active matrix display device according to the present invention.

The invention will now be described with reference to the drawings, wherein like reference numerals are used to refer to like elements shown therein.

Referring to FIGS. 1 to 4, a display panel includes a lower transmissive insulating substrate 1 (FIG. 2) and an upper transmissive insulating substrate 2 disposed with a liquid crystal 18 sandwiched therebetween. The lower substrate 1 is provided with a plurality of gate buses 21 for scanning buses, a plurality of source buses 23 (FIG. 1) so that each rectangular section enclosed by the buses 21 and 23 has pixel electrodes 41 arranged in a matrix. The gate bus 21 has a branch line 22 which is provided with a TFT 31 at its top, i.e., distal, end. The TFT 31, functioning as a switching element, is connected to the pixel electrodes 41. In FIG. 1, a gate bus 21*b* adjacent to a gate bus 21*a* connected to the pixel electrodes 41 is provided with a gate bus projection 43 extending inward toward the corner of the pixel electrodes 41. The projection 43 is provided with an electroconductive member 44 positioned opposite thereto through a gate insulating film 13 (FIGS. 3 and 4), the electroconductive member 44 being electrically connected to the pixel electrode 41.

The source bus 23 is also provided with a source bus projection 46 in correspondence with the corners of the pixel electrodes 41. The source bus projection 46 overlaps the gate bus projection 43 through the gate insulating film 13.

Figure 4:
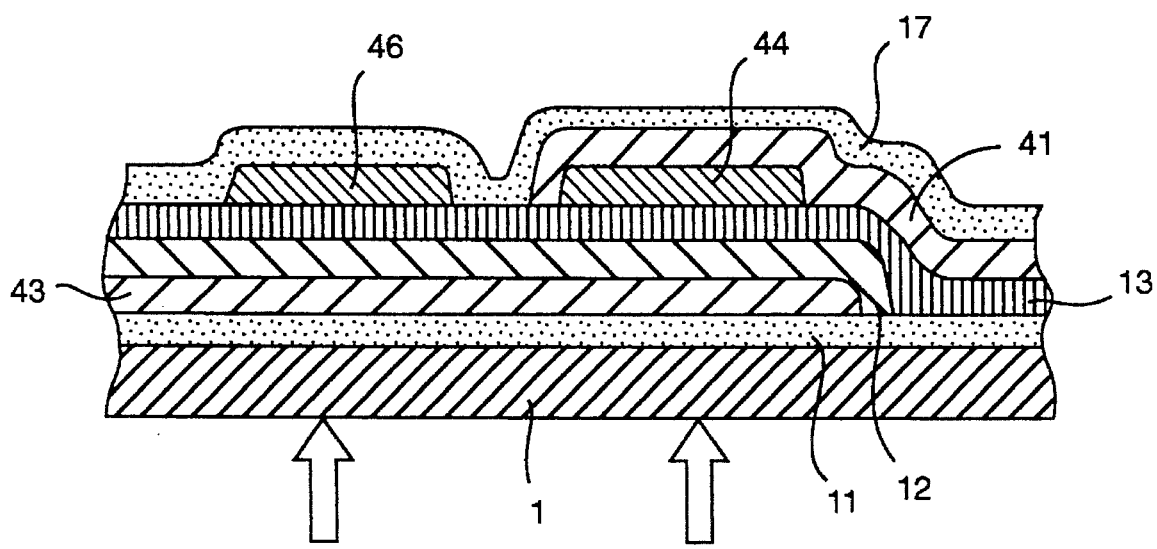
FIG. 4 is a cross-sectional view taken along the line 4—4 in FIG. 3.

A process of fabricating the display panel will be described in detail:

The gate buses 21 are formed on the transmissive insulating substrate 1 in a known manner. For example, metal such as Ta, Ti, Al or Cr is deposited either as a single layer or a multi-layers on the transmissive insulating substrate, and then the layer or layers are patterned. Simultaneously, the gate bus branch 22 and the gate bus projection 43 are patterned for each pixel electrode. In this example, the insulating substrates 1 are made of glass (in some of the drawings, one substrate only is shown for explanation convenience). It is possible to form an insulating film 11 of $Ta_2O_5$ or the like as a base coat as shown in FIG. 4.

Then, the gate insulating layer 13 is overlaid on the gate bus 21 (including the gate bus branch 22 and the gate bus projection 43). In this example, as $SiN_X$ film was formed to a thickness of 300 nm by a plasma CVD as the insulating layer 13. Alternatively, it is possible to form an oxidized layer 12 of $Ta_2O_5$ by anodizing the gate bus 21 prior to the formation of the gate insulating layer 13 as shown in FIG. 4.

A semiconductor layer 14 and an etching stopper layer 15 are successively formed on the gate insulating layer 13 by a plasma CVD method. The semiconductor layer 14 is made of amorphous silicon (a-Si) to a thickness of 30 nm, and the etching stopper layer 15 is made of $SiN_X$ to a thickness of 200 n. The etching stopper layer 15 is patterned, and an $n^+$ type a-Si layer 16 with phosphorus is deposited to a thickness of 80 nm by the plasma CVD method. The $n^+$ type a-Si layer 16 is formed to enhance the ohmic contact between the semiconductor layer 14 and a source electrode 32 or a drain electrode 33 (FIG. 2) which will be deposited at a later stage.

Figure 2:
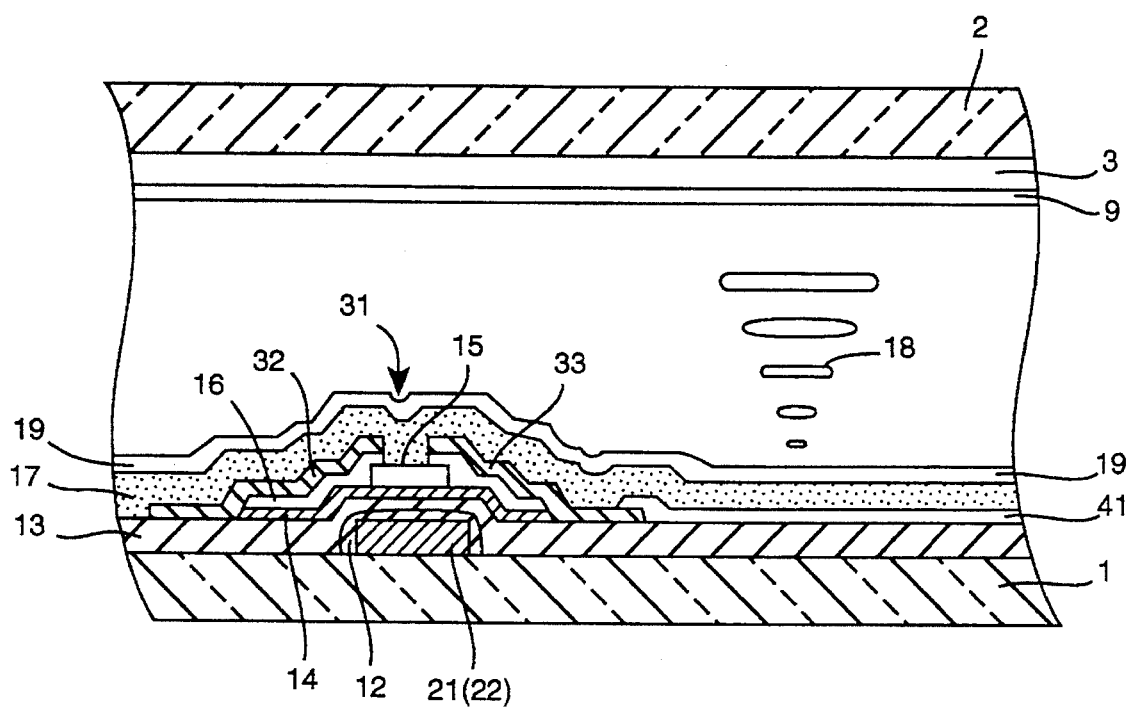
FIG. 2 is a cross-sectional view taken along the line 2—2 in FIG. 1, and is also a cross-sectional view taken along the line 2-2 in FIG. 14.

Then, the $n^+$ type a-Si layer 16 is patterned, and a source metal such as Ti, Al, Mo, or Cr is deposited by sputtering. In this example, Ti was used. The Ti layer is patterned so as to form the source electrode 32 and the drain electrode 33. The finished thin film transistor (TFT) 31 is illustrated in FIG. 2. At this stage, as shown in FIG. 4, the source bus projection 46 and the electroconductive member 44 are simultaneously formed.

Figure 3:
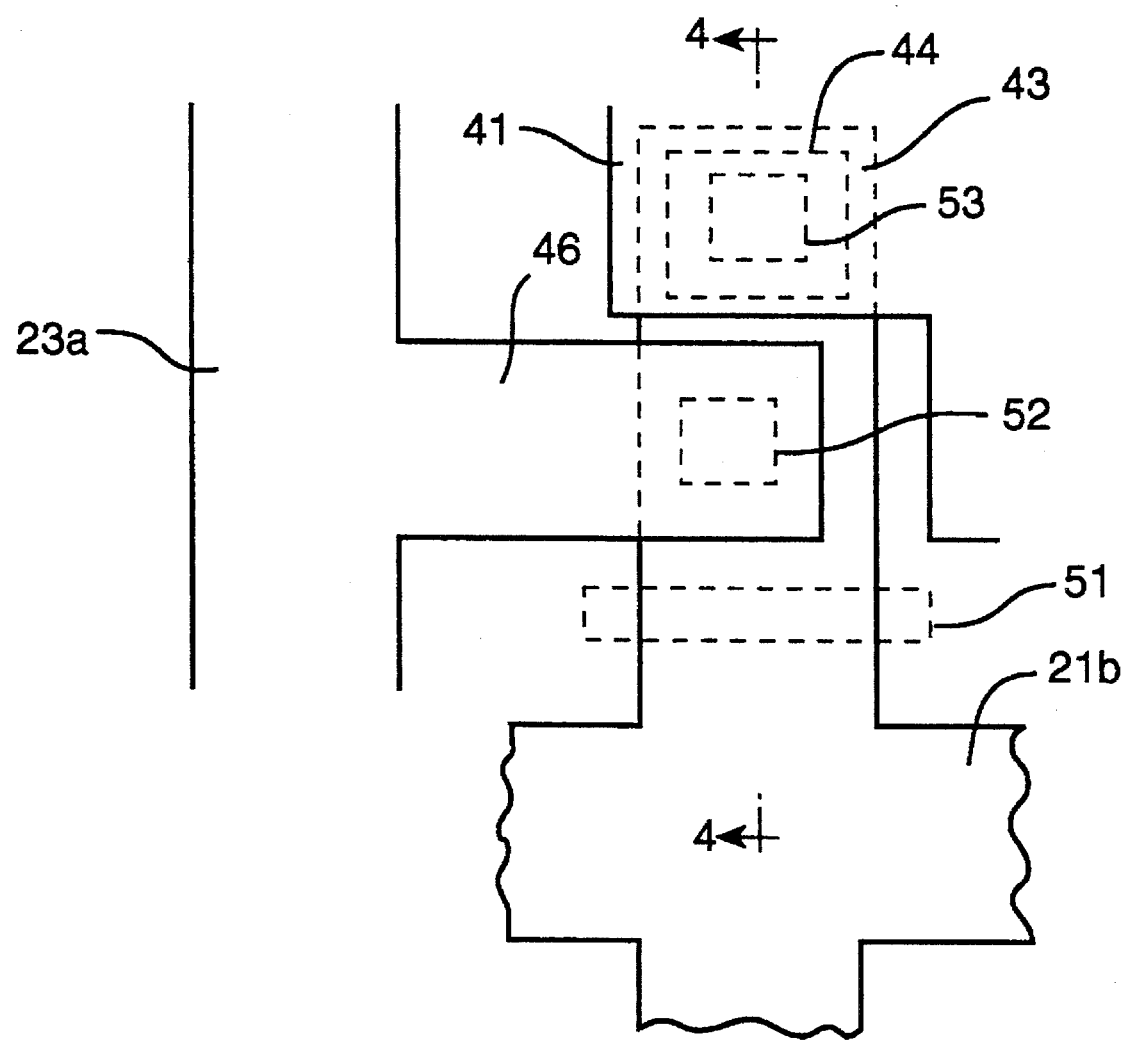
FIG. 3 is a fragmentary plan view on an enlarged scale showing the active matrix display device shown in FIG. 1.

The next step is to deposit a transmissive insulating substance for the pixel electrodes 41. In this example, ITO (indium tin oxide) was deposited by sputtering and patterned so as to form the pixel electrodes 41, which, as referred to above, is formed in the rectangular section enclosed by the gate bus 21 and the source bus 23. As shown in FIG. 2, the end portion of the pixel electrode 41 is overlaid on an end portion of the drain electrode 33 of the TFT 31. Also, as shown in FIGS. 3 and 4, the pixel electrode 41 is deposited on the electroconductive member 44. In this way, energizing can be effected through to the pixel electrodes 41 via the drain electrode 33 of the TFT 31 and the electroconductive member 44 as is described below.

The whole surface of the glass substrate 1 and the respective layers formed thereon is covered with a protective layer 17 of $SiN_X$. The protective layer 17 can be provided with a hole at a central part of the pixel electrodes 41. An orientation layer 19 is formed on the protective layer 17. The orientation layer 19 can be also provided with a hole at its center. As shown in FIG. 2, a counter electrode 3 and an orientation layer 9 are formed on the glass substrate 2. The reference numeral 18 denotes a layer of liquid crystal material sandwiched between the pair of insulating substrates 1 and 2. In this way an active matrix display device is finished.

A method of correcting a faulty pixel electrode will be described:

The pixel electrodes 41 are driven by the TFT 31, unless the TFT 31 is in abnormal, i.e., defective, condition, and the pixel electrodes 41 in the segment enclosed by the gate bus 21 and the source bus 23 are put into regular operation. No problem arises on the display. If any abnormality occurs in the TFT 31 or a weak electric leak occurs between the source bus 23 and the pixel electrodes 41, the pixel electrode becomes faulty, and the result appears on the display. This faulty pixel electrode is corrected in the following manner:

First, the active matrix display device is driven so as to confirm the faulty pixel electrode. As shown in FIG. 3, if any abnormality is discovered, a segment 51 enclosed by dotted lines is irradiated with photo energy such as YAG laser beams so as to disperse the metal molecules in this segment 51. In this way the gate bus 21b and the gate bus projection 43 are electrically disconnected from each other. Then a segment 52 enclosed by dotted lines is irradiated with laser beams so as to destroy the insulating layer 13 and oxidized layer 12 (if present) between the source bus projection 46 and the gate bus projection 43. Thus the two projections 46 and 43 are melted together or otherwise come into contact to form an electrical connection, thereby enabling them to electrically communicate with each other.

The laser beams can be irradiated either from the side of the insulating substrate 1 on which the TFT 31 is formed or from the side of the substrate 2 on which the counter electrode is provided. In this example, the laser beams are irradiated from the side of the substrate 1 because of the coverage of the substrate 2 with a light shield metal. In FIG. 4, the directions of laser beams are indicated by white thick arrows.

Second, laser beams are irradiated upon the segment 53, where the gate bus projection 43 and the electroconductive member 44 overlap each other. This irradiation destroys the insulating layer 13, thereby enabling the gate bus projection 43 and the electroconductive member 44 to electrically communicate by fusing or otherwise coming into contact with each other. The two irradiations of laser beams enable the upper and lower metal wirings to electrically communicate in the segments 52 and 53, respectively. In this way the source bus 23 and the electroconductive member 44, that is, the pixel electrodes 41 are short-circuited.

Because of the short-circuit the pixel electrode 41 has the same potential as the source bus 23 and the faulty pixel is lit at an average brightness achieved by all the normal pixels connected to the source bus 23, thereby avoiding a faulty display.

The gate bus branch 22 and the TFT 31 are covered with the protective layer 17, thereby preventing molten metal molecules from admixing with the liquid crystal 18. This avoids the deterioration of the liquid crystal 18.

The irradiation of laser beams can be in various order for the segments 51, 52, and 53 as desired. Besides, the spots of irradiation need not be limited to the illustrated ones but any desired spots can be selected; for example, in the segments 52 and 53 any desired spots can be selected if they are within the overlapping portions of the upper and lower electroconductive layers.

Figure 5:
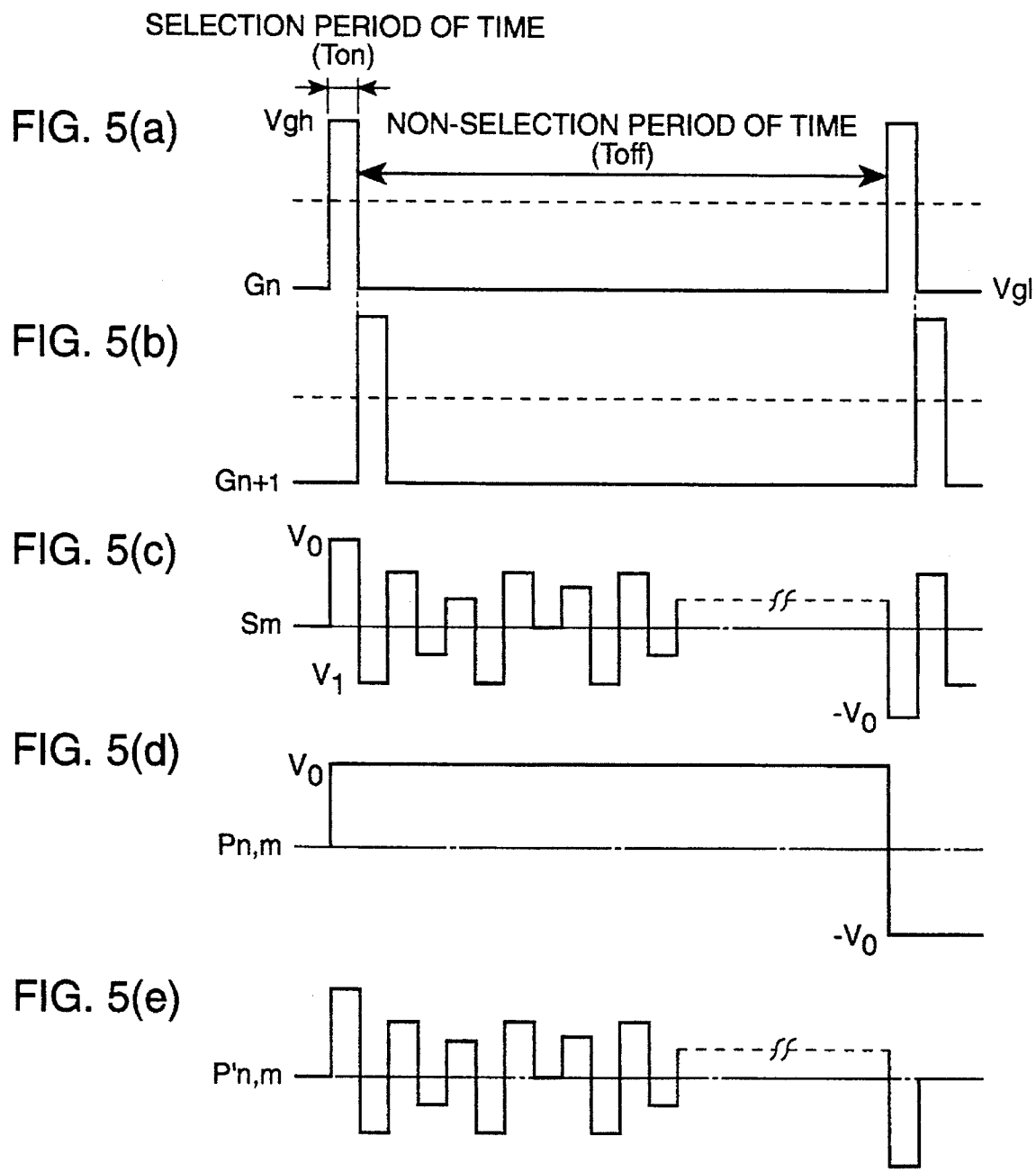
FIG. 5 is a timing chart showing the signals input to the gate bus, source bus and pixel electrodes.

Referring now to FIG. 5, explanation will be given as to how the TFT is operated when the pixel electrodes 41 and the source bus 23 are short-circuited;

In FIG. 5, $G_n$ is a signal (voltage signal) from the (n)th gate bus 21, $S_m$ is a signal from the (m)th source bus 23, $P_{n,m}$ is a signal given to pixel electrodes 41 present at the junction of the (n)th gate bus 21 and the (m)th source bus 23.

As shown in FIG. 5(a), when the potential of the signal from the gate bus 21 is Vgh (at a high level), the TFT 31 is selected, and when it is Vgl (at a low level), the TFT 31 is not selected. As shown in FIG. 5(c), when the TFT 31 is selected, a pulse signal V0 is charged in the pixel electrodes 41. When the pixel electrode 41 is in a normal operation, the signal V0 is held for a period of time Toff when the TFT 31 is not selected, and a signal −V0 is written in the source bus 23 at a point of time Ton when the TFT 31 is selected.

In FIG. 5(b) the reference signal Gn+1 denotes a signal applied to the (Gn+1)th gate bus 21. This signal Gn+1 is selected when the period of time Ton for selecting the gate bus 21 expires. At this time the signal −V1 is written in the source bus 23 (FIG. 5(c)). As is evident from FIGS. 5(a1) and 5(b), the signals applied to the gate bus 21 are consecutively delayed in the order of the line number, and the non-selection period of time continues over the period of time Toff until the (n)th gate bus 21 is selected. During the non-selective period of time signals to be written in the pixel electrodes 41 are continuously applied to the source bus 23.

As shown in FIG. 5(d), the pixel electrodes 41 that are in normal condition are charged in response to the signal Sm input from the source bus 23 when the gate signal Gn is selected, thereby changing the molecular arrangement of the liquid crystal 18 at an electric potential between the counter electrode 3 on the substrate 2 and the liquid crystal 18. In this way the display is effected. At this stage, the signals Sm input to the source bus 23 during the non-selection period of time Toff do not contribute to the display at all.

When the pixel electrodes 41 and the source bus 23 are short-circuited by the irradiation of laser beams as described above, for example, the pixel electrodes 41 are subjected to electrical charging or discharging in response to all the signals Sm input from the source bus 23 irrespective of the selection and non-selection of the gate bus 21, wherein the signal is indicated by P'n,m in FIG. 5(e). The pixel electrode 41 that was corrected by the irradiation of laser beams receives the signal Sm directly from the source bus 23 during the non-selection period of time Toff. Thus, the voltage is applied to the liquid crystal 18 at its effective value. Except when the signals Sm applied to the source bus 23 becomes V0, the effective value of the signal P'n,m cannot be V0, but the effective value of the signal voltage P'n,m is an average value of all the pixel electrodes 41 connected to the (m)th source bus 23. This means that the display device is lit at an average brightness of the pixel electrodes 41 arranged along the (m)th source bus 23. Each pixel electrode is lit at such a sufficient brightness so as to maintain the quality of representation on the screen.

It will be appreciated that the electrical resistance of the short-circuited portions formed by the laser irradiation preferably have a smaller value than the resistance (ON resistance) when the switching element 31 is selected. The reasons are as follows. Normally, the ON resistance between the source bus 23 and pixel electrode 41 via the TFT 31 is set so as to accept the flow of the current enough to allow the pixel electrode to be charged within the selection period of time of the switching element. If the short-circuited resistance is larger than the ON resistance, all of the source signals which are continuously input during the selection period of time of the switching element cannot be written because of lack of time, thereby reducing the effective value of the voltage applied to the pixel electrode.

Figure 6:
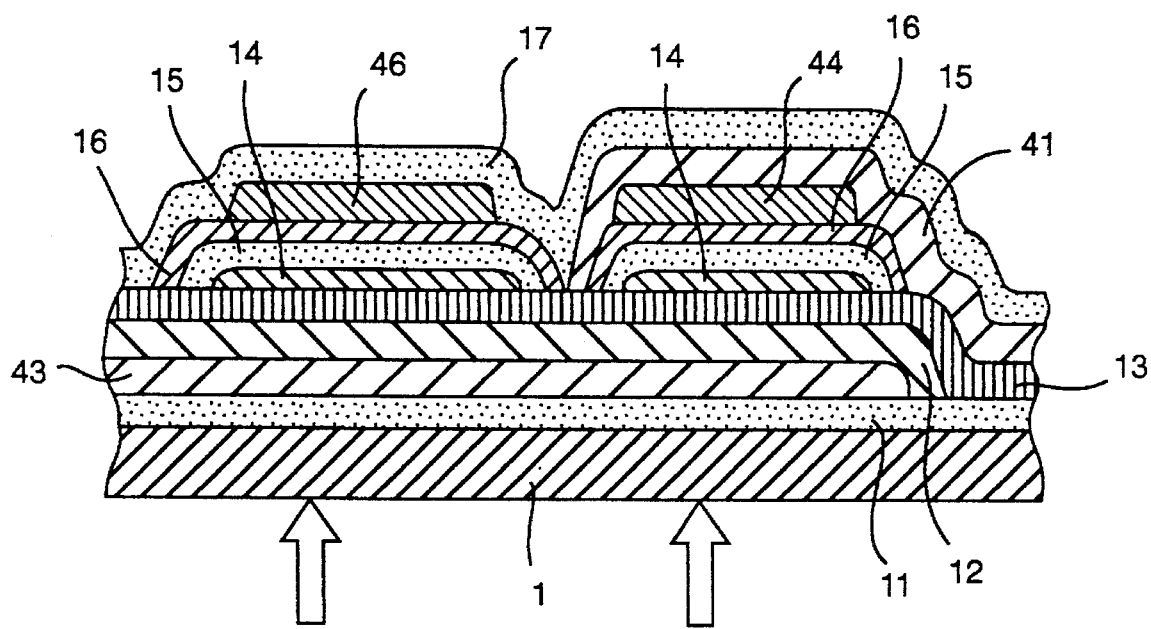
FIG. 6 is a cross-sectional view showing a modified version of the present invention.

FIG. 6 shows a modified version which includes a semiconductor layer 14, an etching stopper layer 15 and a contact layer 16 between the gate insulating layer 13 and an electroconductive member 44, and between the gate insulating layer 13 and the source bus projection 46, respectively. These layers 14 to 16 ar provided to electrically disconnect the upper electroconductive layers from the lower electroconductive layers, and vice versa. Instead of these layers 14 to 16, the semiconductor layer 14 and the etching stopper 15, or the contact layer 16 alone can be inserted. The layers 14–16 can similarly be destroyed in the segments 52 and 53 by laser irradiation, and again the source bus projection 46 and electroconductive member 44 can be fused to the gate bus projection 43.

Figure 7:
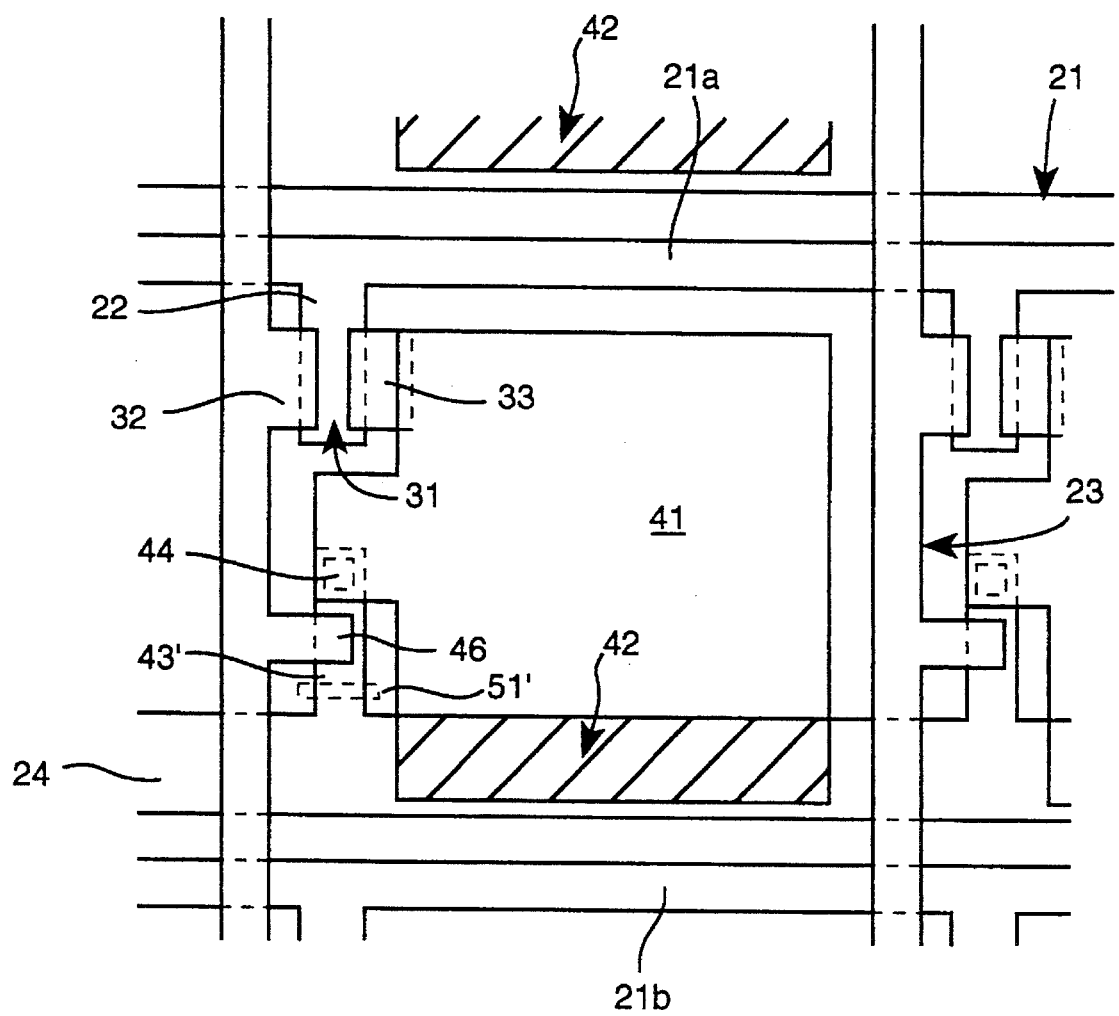
FIG. 7 is a plan view showing another example of the present invention.

FIG. 7 shows a further modified version in which each pixel electrode 41 has an additive capacitance 42 which is constituted by an additive capacitance bus 24 arranged in parallel with the gate bus 21 and the gate insulating layer 13. More specifically, the additive capacitance bus 24 is overlapped by the pixel electrodes 41, and the additive capacitance 42 is formed on the overlapping portion as shown by hatching in FIG. 7. The additive capacitance bus 24 is formed by depositing the same metal as that of the gate bus 21, and patterning simultaneously when the gate bus 21 is patterned.

This example shown in FIG. 7 is constructed so that the same signal is input to the additive capacitance bus 24 as the counter electrode 3. As a circuit the additive capacitance 42 is in parallel with the capacitance of the liquid crystal 18. The additive capacitance 42 maintains the charge of the pixel electrodes 41, thereby enhancing the performance of the display device. In this example, the faulty pixel can be corrected in the same manner as described above. However, in this example it is noted that the additive capacitance bus 24 includes a projection 43' which serves as a means for electrically short-circuiting the faulty pixel electrode 41 to the source bus projection. Specifically, the segment 51' is irradiated in the manner described above with respect to the segment 51 so as to electrically disconnect the projection 43' from the additive capacitance bus 24. In addition, the source bus projection 46 and the electroconductive member 44 are fused to the projection 43' in the same manner described above with respect to the gate bus projection 43.

Figure 8:
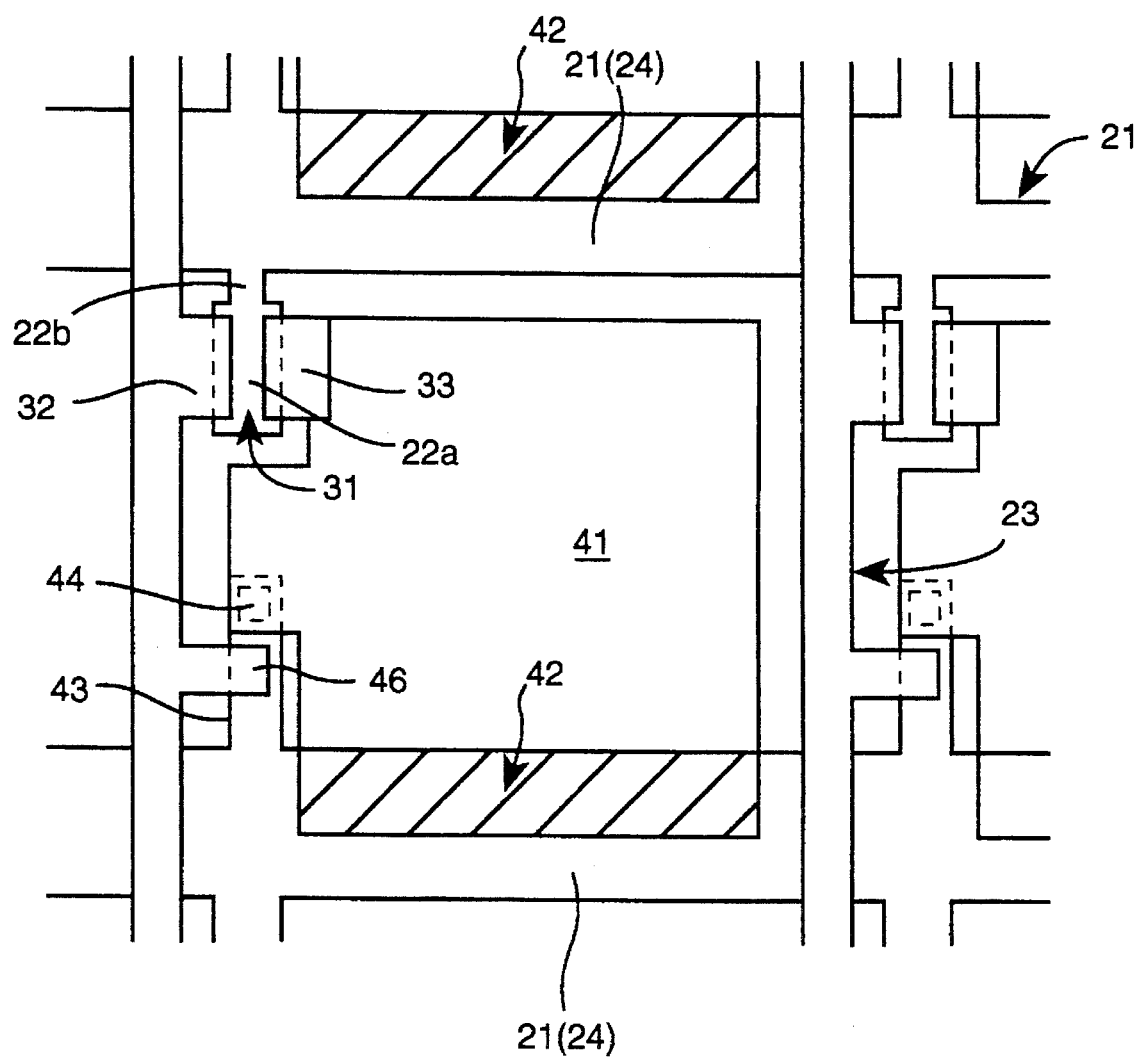
FIG. 8 is a plan view showing another example of the present invention.
Figure 9:
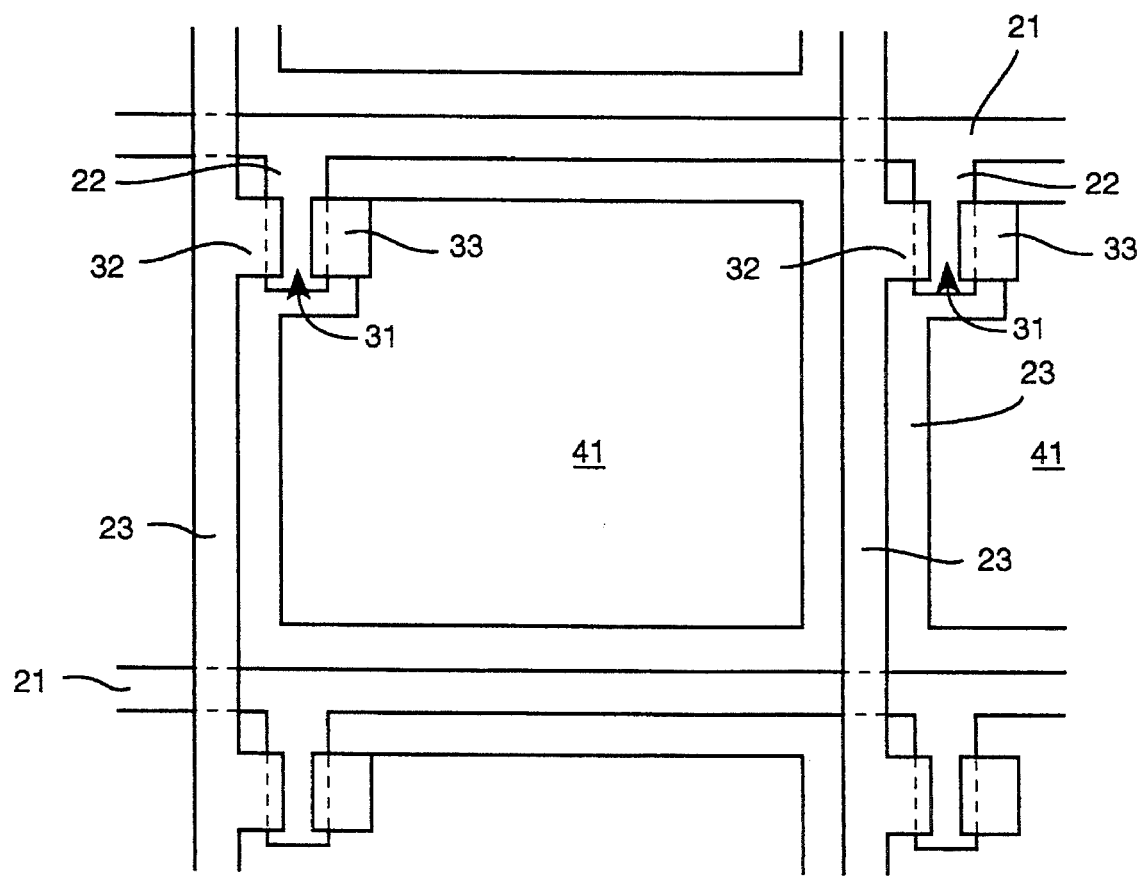
FIG. 9 is a plan view showing an example of a prior art active matrix display device.
Figure 10:
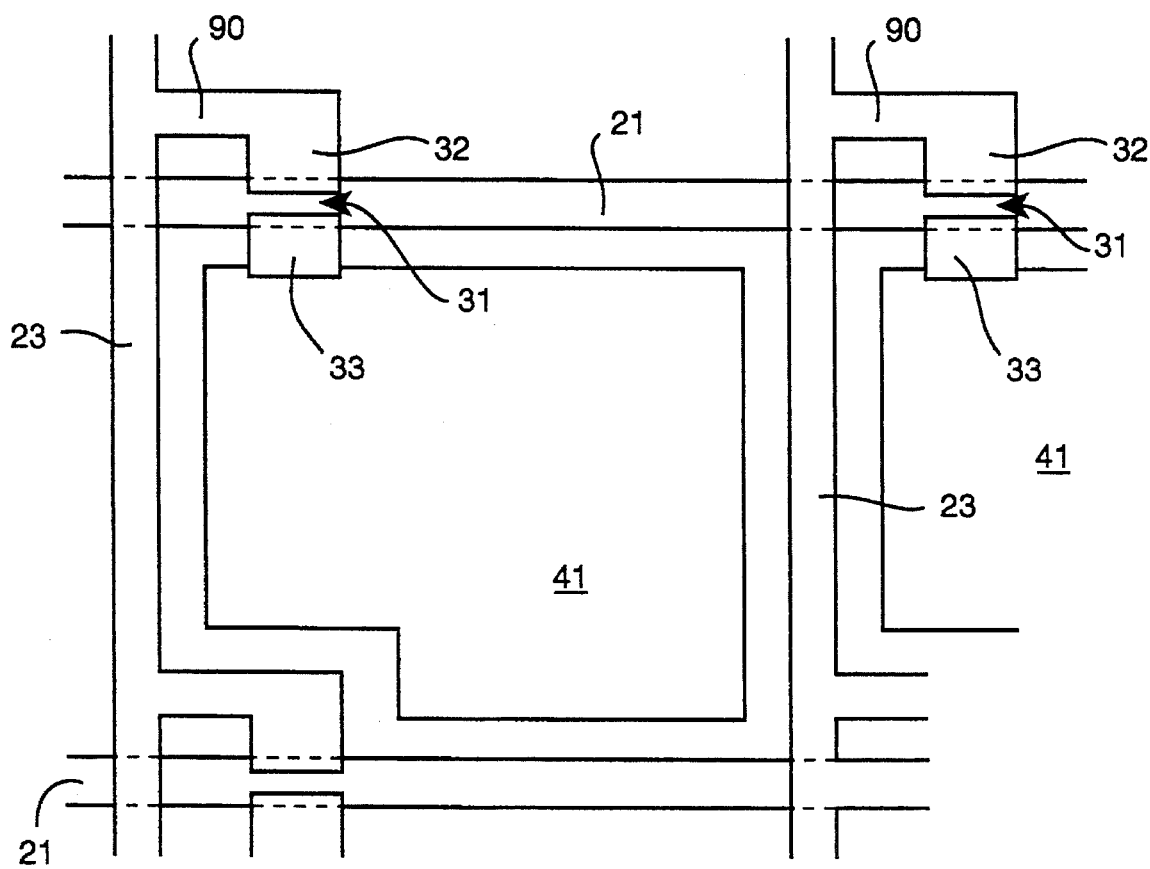
FIG. 10 is a plan view showing another example of a prior art active matrix display device.

FIG. 8 shows another modified version in which the additive capacitance 42 is formed on the adjacent gate bus 21. More specifically, the additive capacitance 42 is formed on an overlapping portion of the pixel electrodes 41 and the gate bus 21 through the gate insulating layer 13 as shown by hatching in FIG. 8. When the adjacent gate bus 21 is not selected, the same signal is input to the gate bus 21 as that applied to the counter electrode 3 on the glass substrate 2. This gate bus 21 is used as the additive capacitance bus 24. This decreases the light shading area, thereby avoiding a dark image picture. Thus the display performance is enhanced.

In the illustrated embodiments the TFTs are used as switching elements, but an MIM element, a MOS transistor, a diode for a varistor can be used. The TFT is not limited to the illustrated structure but can be variously modified; for example, a source bus can be placed as a lower layer, and a gate bus can be placed as an upper layer.

Figure 11:
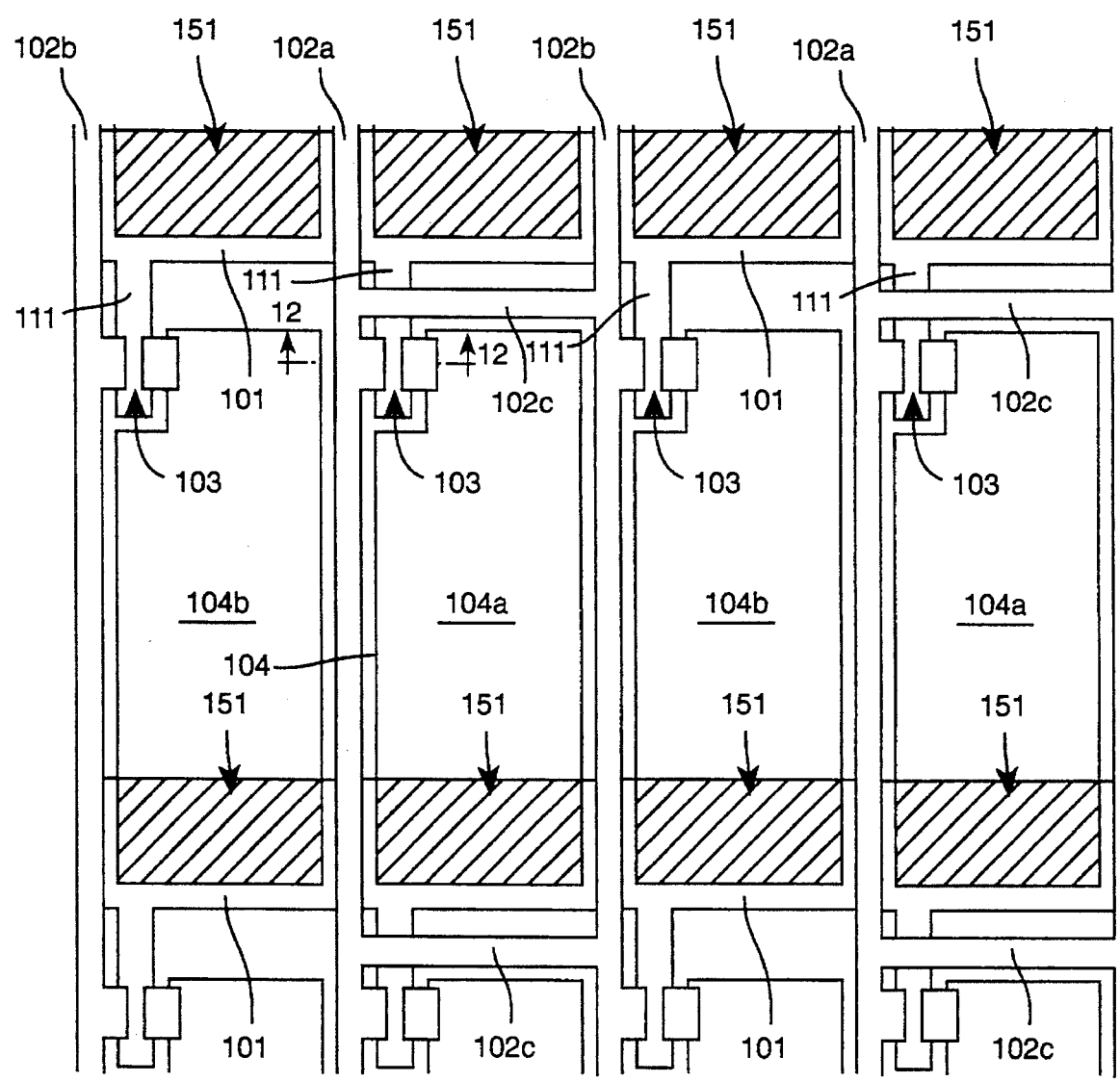
FIG. 11 is a plan view showing a substrate used in an active matrix display according to the present invention.
Figure 12:
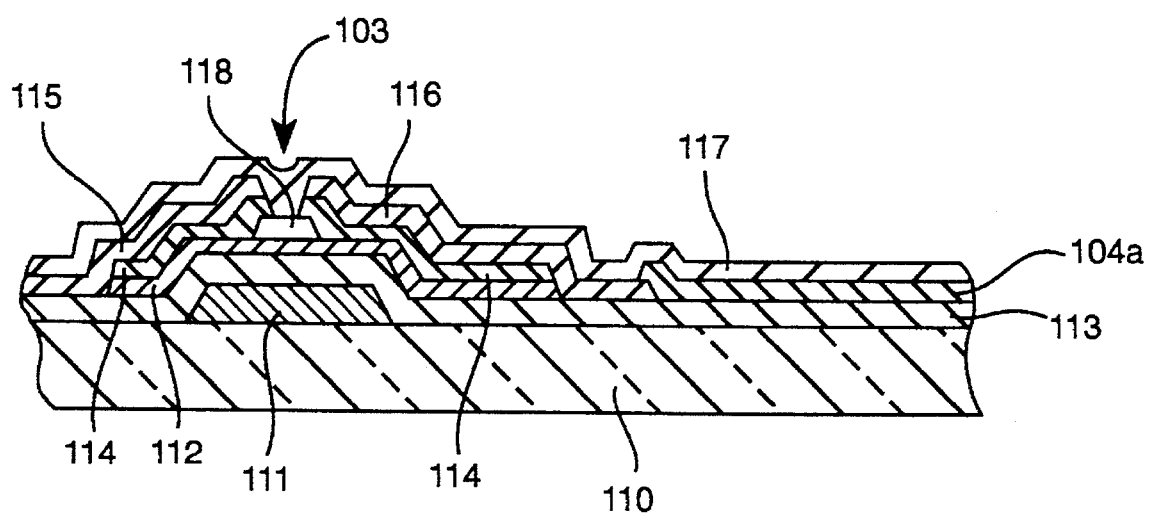
FIG. 12 is a cross-sectional view taken along the line 12—12 in FIG. 11.

Referring to FIGS. 11 and 12, an active matrix substrate suitable for use in the active matrix display device will be described:

An insulating substrate 110 is provided with pixel electrodes 104 arranged in a matrix, each pixel electrode being divided into two electrodes 104a and 104b, which will be hereinafter referred to as split electrodes, two source buses 102a and 102b, the source buses 102a and 102b passing in parallel between adjacent split electrodes 104a and 104b so as to transmit the same signal, and a gate bus 101 crossing at right angles to the source buses 102a and 102b, the gate bus 101 overlapping a part of the pixel electrodes 104, a gate bus branch 111, thin film transistors (TFTs) 103 and a connection line 102c connecting the two source buses 102a and 102b. The connection line 102c crosses the gate bus branch 111 with an insulation layer interposed therebetween.

The gate buses 101 function as scanning lines, the source buses 102a and 102b as signal lines, the gate bus branches 111 as scanning branches, and the TFT 103 as a switching element.

The active matrix substrate is fabricated as follows:

A Ta layer is formed on the insulating substrate 110 by sputtering, and patterned to form the gate bus 101 and the gate bus branch 111. As referred to above, Ti, Al or Cr can be used instead of Ta. The layer can be single or multiple. It is possible to cover the whole surface of the substrate 110 with an insulating layer of $Ta_2O_5$. The surfaces of gate bus 101 and the gate bus branch 111 can be anodized so as to form an anodized layer. Other parts of the process are the same as those described above. In the illustrated embodiment, one pixel electrode is split into two parts by the two source buses 102a and 102b which transmit the same image signal, but the substrate 110 can be provided with three source buses or more which transmit the same signal. In this case, the three source buses must be mutually connected by use of two or more connection lines. It is not always necessary to provide each pixel electrode with the connecting line 102c but it is sufficient if the source buses 102a and 102b are connected by at least one connecting means.

If either of the source bus 102a or 102b breaks, an image signal is sent by the other source bus through the connecting lines 102c so as to enable the image signal to reach beyond the broken point, thereby avoiding the occurrence of troubles due to line breakage. The gate buses 101 constitute additive capacitance electrodes, thereby reducing the area of the pixel electrodes 104 as a whole.

Figure 13:
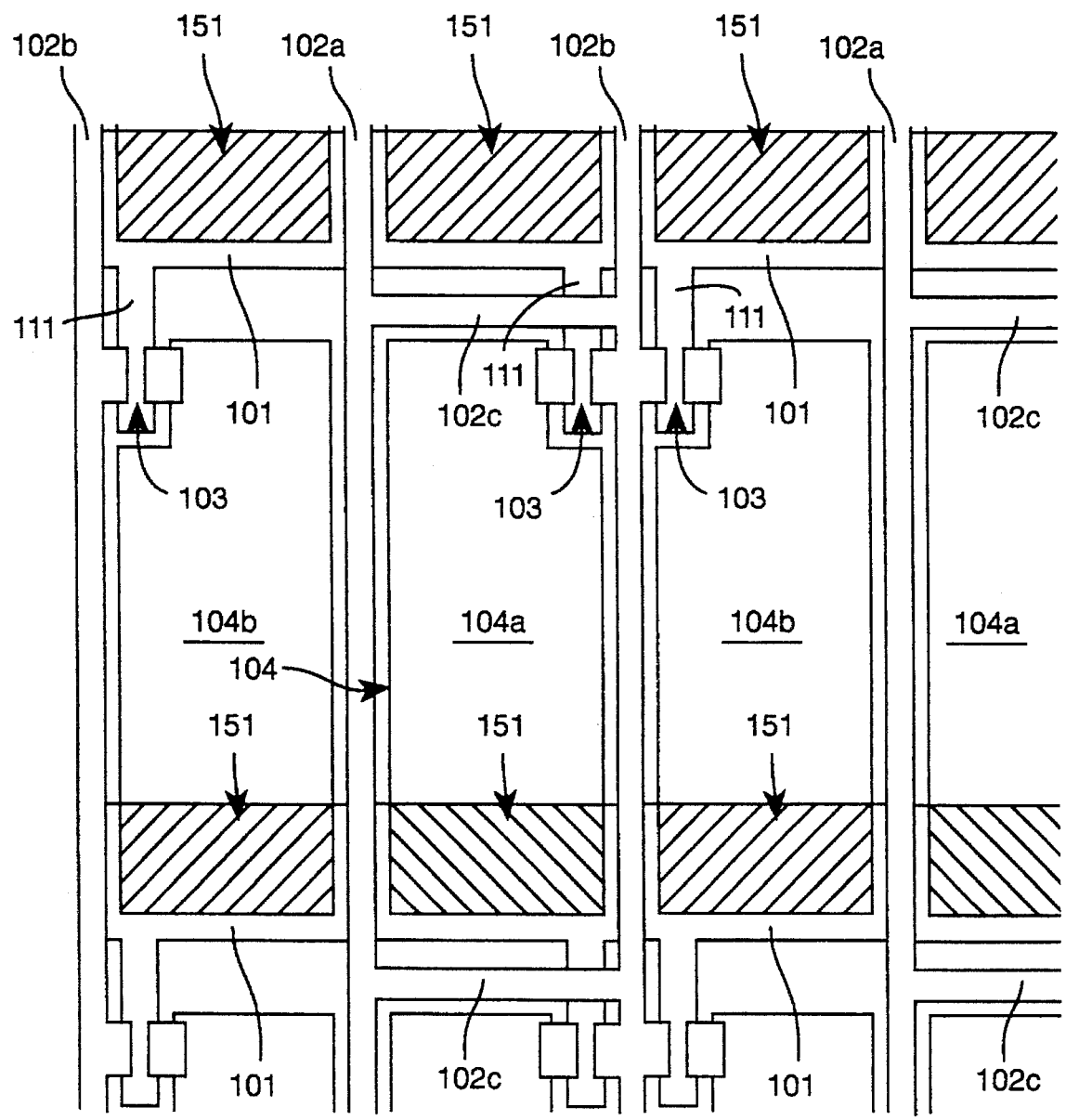
FIG. 13 is a plan view showing other example of the substrate.

FIG. 13 shows a modification to the substrate shown in FIGS. 11 and 12. Two TFTs 103 connected to the split electrodes 104a and 104b are connected to the same source buses 102a or 102b. The other structure is the same as that of FIG. 11. TFTs 103 are not connected to the source bus 102a that functions as a bypass.

Figure 14:
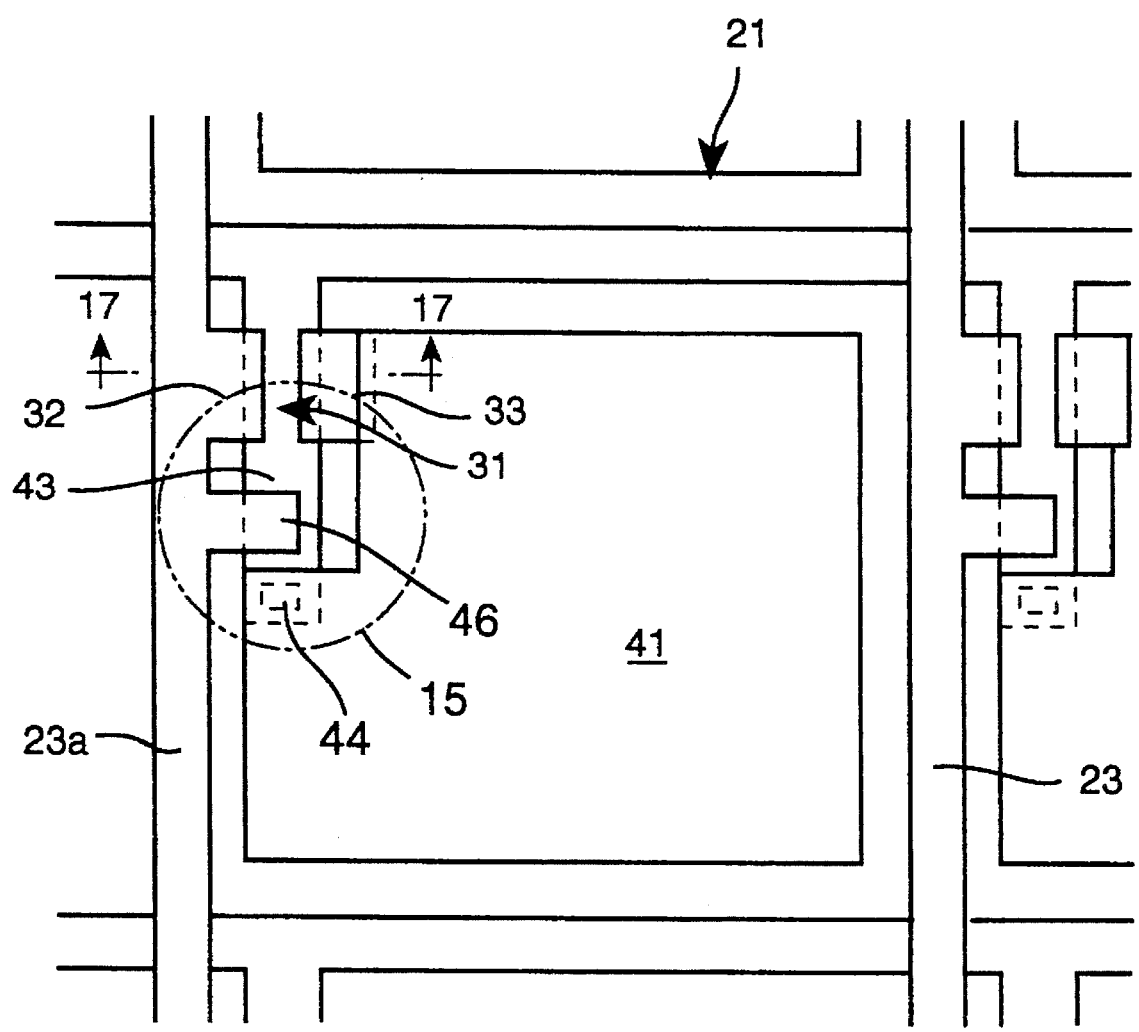
FIG. 14 is a plan view showing still another active matrix display device according to the present invention.
Figure 15:
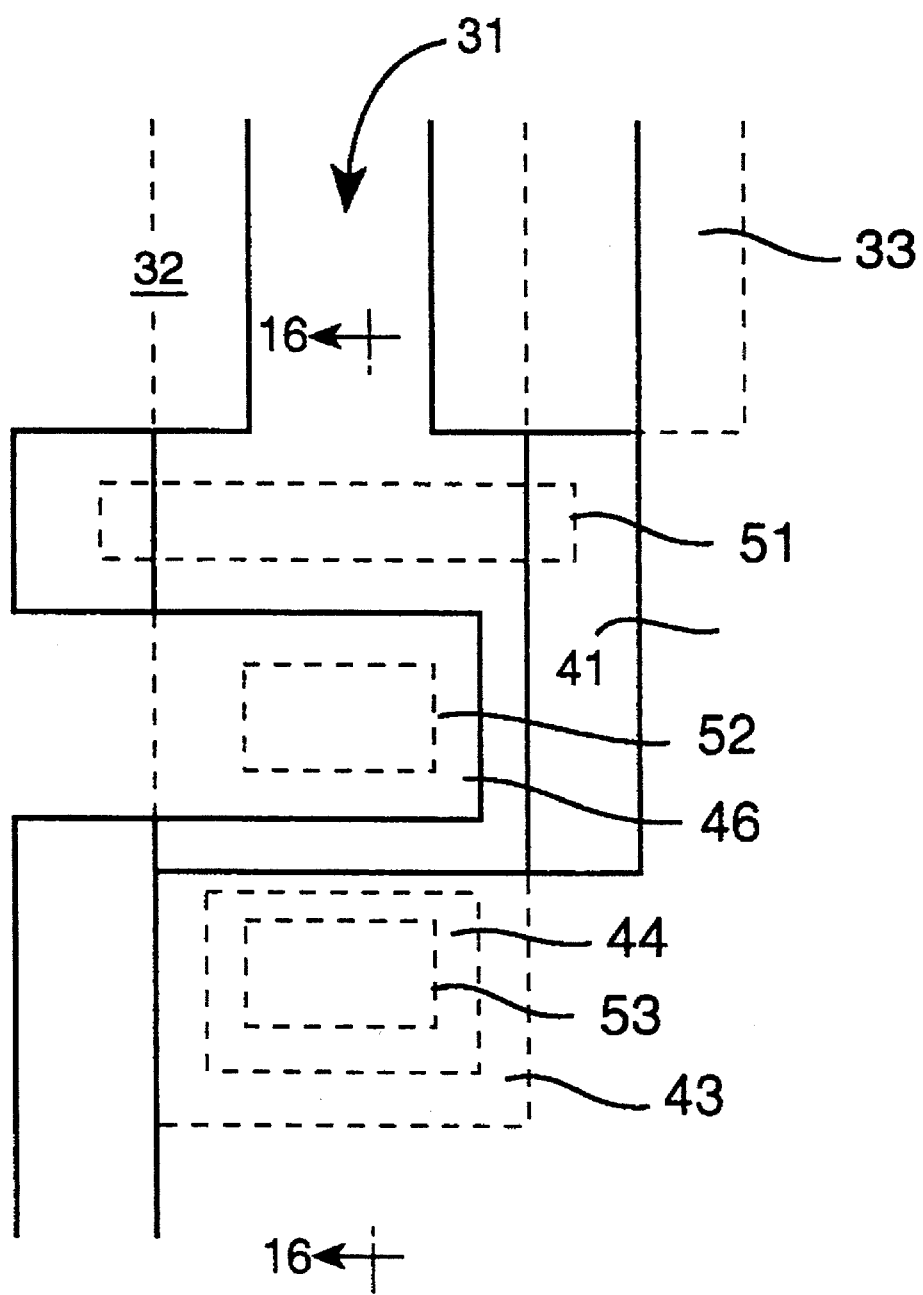
FIG. 15 is a fragmentary plan view on an enlarged scale showing the active matrix display device shown in FIG. 14.
Figure 16:
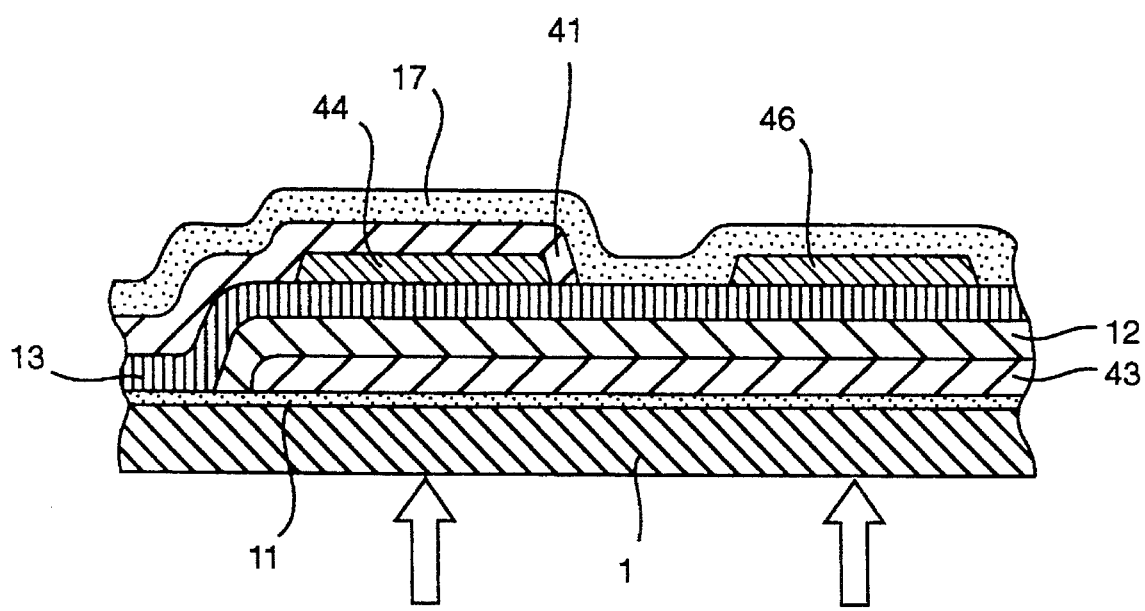
FIG. 16 is a cross-sectional view taken along the line 16—16 in FIG. 15.

FIG. 14 to FIG. 16 show an active matrix display device in accordance with another example of the present invention. This display device 200 includes a liquid crystal 18 sandwiched between a pair of lower and upper transmissive insulating substrates 1 and 2 as in the embodiment described with respect to FIG. 2. The lower substrate 1 is provided with a plurality of horizontal gate buses 21, e.g., 21a, 21b, etc., which function as scanning lines, a plurality of vertical source buses 23 which function as signal lines so that each rectangular section enclosed by both buses 21 and 23 has a pixel electrode 41 arranged in a matrix. The gate bus 21 has a gate bus projection 43 extending therefrom toward the pixel electrode 41 and a TFT 31 is formed on the proximate portion of the gate bus projection 43 near the gate bus. The TFT 31, functioning as a switching element, is connected to the pixel electrode 41. The gate bus projection 43 extends towards a source bus projection 46 which extends from the source bus 23 toward the pixel electrode 41, and is positioned opposite an electroconductive member 44 with a gate insulating layer 13 therebetween as shown in FIGS. 15 and 16. Again, the electroconductive member 44 is electrically connected to the pixel electrode 41. The middle portion of the gate bus projection 43 intersects the source bus projection 46 so as to be overlapped by the source bus projection 46 with the insulating layer 13 therebetween.

The active matrix display device 200 will now be described according to a process of fabrication. The gate bus line 21 is formed on the transmissive insulating substrate 1 as shown in FIG. 2. (It will be appreciated that FIG. 2 herein is representative of a cross-sectional view taken along the line A—A in FIG. 14 as well as FIG. 1). Generally, metal such as Ta, Ti, Al or Cr is deposited either as a single layer or as multilayer on the transmissive insulating substrate 1 by a sputtering method, and then the metal is patterned. Simultaneously, the gate bus projection 43 is formed. In this example, a glass substrate 1 was used as the transmissive insulating substrate 1. It is possible to form an insulating film 11 of $Ta_2O_3$ or the like as a base coat film below the gate bus 21 as shown in FIG. 16.

Then, the gate insulating film 13 is overlaid on the gate bus 21 (including the gate bus projection 43). In this example, as $SiN_x$ film was formed to a thickness of 300 nm by a plasma CVD method as the insulating layer 13. Alternatively, it is possible to form an oxidized layer 12 of $Ta_2O_5$ by anodizing the gate bus 21 prior to the formation of the gate insulating layer 13 as is shown in FIG. 16.

Next, a semiconductor layer 14 and an etching stopper layer 15 are successively formed on the gate insulating layer 13 by a plasma CVD method. The semiconductor layer 14 is made of amorphous silicon (a-Si) layer to a thickness of 30 nm, and the etching stopper layer 15 is made of a $SiN_8$ layer to a thickness of 200 nm. The etching stopper layer 15 is patterned, and then an n+ type a-Si film 16 with phosphorus is deposited to a thickness of 80 nm by the plasma CVD method. The n+ type a-Si layer 16 is formed to enhance the ohmic contact between the semiconductor film 14 and a source electrode 32 or a drain electrode 33 (cf. FIG. 2) which will be deposited at a later stage.

Then, the n+ type a-Si layer 16 is patterned, and a source metal is deposited by the sputtering method. As the source metal, Ti, Al, Mo, Cr or the like is generally used. In this example, Ti was used. The Ti metal layer is patterned so as to obtain the source electrode 32 and the drain electrode 33. Thus, the TFT 31 having the structure illustrated in FIG. 2 is formed. At this stage, as shown in FIG. 16, the source bus projection 46 and the electroconductive member 44 are simultaneously formed.

The next step is to deposit a transmissive conductive substance for the pixel electrodes 41. In this example, as the transmissive conductive substrate ITO (indium tin oxide) was deposited by the sputtering method and patterned so as to obtain the pixel electrodes 41. As referred to above, the pixel electrode 41 is formed in the rectangular section enclosed by the gate buses 21 and the source buses 23. As shown in FIG. 2, the end portion of the pixel electrode 41 is deposited on an end portion of the drain electrode 33 of the TFT 31. As more specifically shown in FIG. 15, it is deposited on the electroconductive member 44. In this way, energizing is effected to the pixel electrode 41 via the drain electrode 33 of the TFT 31 and the electroconductive piece 44.

As in the embodiments described above, the whole surface of the glass substrate 1 on which the pixel electrode 41 is formed is covered with a protective layer 17 of SiN$_x$. The protective layer 17 can be a window shape in which a central part of the pixel electrodes 41 is removed. An orientation film 19 is formed on the protective layer 17. The protective layer 17 can be also a window shape in which a central part thereof is removed. As shown in FIG. 2, a counter electrode 3 and an orientation film 9 are formed on the glass substrate 2 facing the glass substrate 1. Liquid crystal material 18 is sandwiched between the glass substrates 1 and 2. In this way an active matrix display device 200 of this example is finished.

The method of correcting pixel defects in the active matrix display device 200 of this example is similar to the previous embodiments and will now be described. The pixel electrodes 41 are usually driven by the corresponding TFT 31; and as long as the TFT 31 is in normal operation, the pixel electrode in the corresponding segment enclosed by the adjacent gate buses 21 and source buses 23 is put into regular operation. No problem arises on the display. If any abnormality occurs in the TFT 31 or a weak electric leak occurs between the source bus 23 and the pixel electrode 41, a pixel defect appears on the display. The problem can be corrected in the following manner.

The active matrix display device 200 is driven so as to confirm the pixel defects. As shown in FIG. 15, if an abnormality is discovered a segment 51 enclosed by dashed lines corresponding to the defective pixel is irradiated with photo energy such as YAG laser beams so as to disperse the metal molecules in this segment 51. In this way the gate bus 21a and the gate bus projection 43 are electrically disconnected from each other. Then a segment 52 similarly enclosed by dashed lines is irradiated with laser beams so as to destroy the gate insulating layer 13 and oxidized layer 12 (if present) between the source bus projection 46 and the gate bus line projection 43. Thus, the metal of the two projections 46 and 43 is fused together or otherwise come into contact thereby enabling them to electrically communicate with each other.

As in the previous examples, the laser beams can be radiated either through the insulating substrate 1 on which the TFT 31 is formed or through the substrate 2 on which the counter electrode is provided. In the active matrix display device of this example, the laser beams are radiated through the substrate 1 because the front surface of the substrate 2 is covered with a light shield metal, making it difficult to directly radiate the laser beams. In FIG. 16 the radiation direction of laser beams is indicated by white thick arrows.

Next, laser beams are radiated upon the segment 53 indicated by dashed lines in FIG. 15, where the gate bus projection 43 and the electroconductive member 44 overlap each other. This irradiation of the segment 53 with laser beams destroys the insulating layer 13 and oxidized layer 12 (if present), thereby melting or fusing, or otherwise bringing into contact the gate bus projection 43 and the electroconductive member 44 together so as to be able to electrically communicate with each other. The above irradiations of laser beams allow the upper and lower metal wirings to electrically communicate with each other in the two areas of the segments 52 and 53. As a result, the source bus 23 and the electroconductive member 44 are short-circuited such that the source bus 23 is short-circuited to the pixel electrode 41.

Because of the short-circuit the defective pixel is lit at an average brightness achieved by all the pixels, thereby avoiding defects on a display owing to the above reasons. Again, the gate bus projection 43 and the TFT 31 are covered with the protective layer 17, thereby preventing molten meal atoms from admixing with the liquid crystal 18 as the display medium by the radiation of the laser beams. This avoids the deterioration of the characteristics of the liquid crystal 18.

The radiation of laser beams can be in various order for the segments 51, 52. and 53, not limited to the above order. Furthermore, the spots of irradiation need not be limited to the illustrated ones. For example, the segments 52 and 53 can be any desired spots so long as they are within the overlapping portions of the upper and lower electroconductive films, e.g., the source bus projection 46 and the gate bus projection 43, the pixel electrode 41 and the gate bus projection 43, or the like.

The manner in which the defective pixel in the active matrix display device 200 is lit at an average brightness when the source bus 23 and the pixel electrode 41 are short-circuited is identical to that which is described above with respect to the embodiment of FIG. 1 and the timing chart of FIG. 5. Thus, further detail is omitted. However, it will still be appreciated that by short-circuiting the pixel electrode 41 to the source bus 23 the quality of the display will be maintained.

Figure 17:
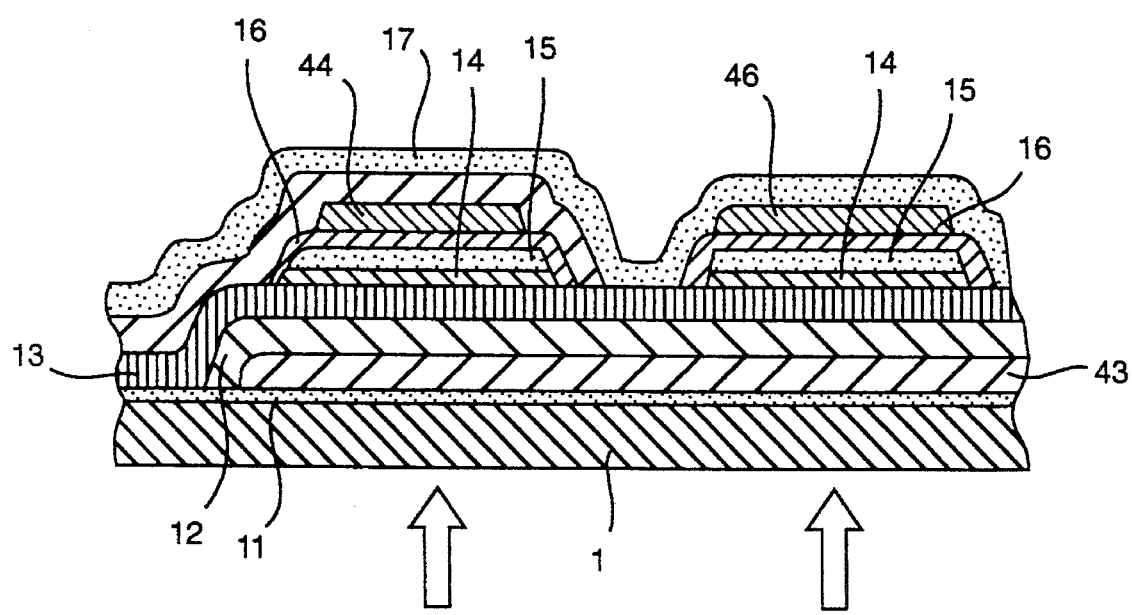
FIG. 17 is a cross-sectional view showing a modified version of the embodiment of FIG. 14.

FIG. 17 shows a modified version of the embodiment of FIG. 14 which includes a structure such that a semiconductor layer 14, an etching stopper layer 15 and a contact layer 16 are deposited between the gate insulating layer 13 and the electroconductive member 44, and between the gate insulating layer 13 and the source bus projection 46, respectively. These layers 14 to 16 are provided to enhance the insulation between the upper electroconductor and the lower electroconductor. Alternatively, the semiconductor layer 14 and the etching stopper layer 15, or the contact layer 16 along can be inserted although the figure thereof is not shown.

Figure 18:
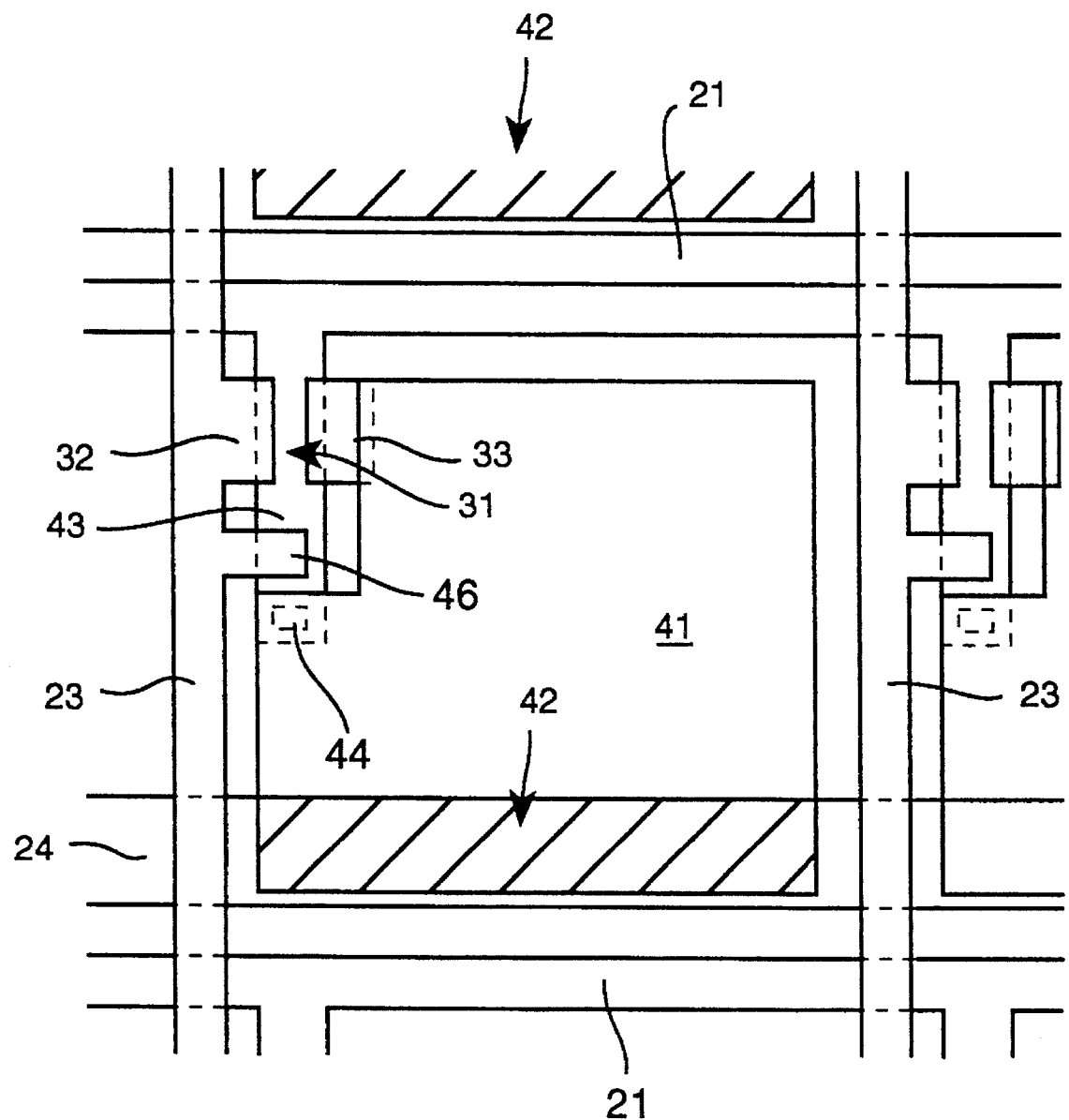
FIG. 18 is a plan view showing still another example of the present invention.

FIG. 18 shows another example of the present invention in which each pixel electrode 41 in an embodiment similar to that of FIG. 14 has an additive capacitance 42. The additive capacitance 42 is constituted by an additive capacitance bus 24 arranged in parallel with the gate bus 21 and the gate insulating layer 13 which is interposed between the additive capacitance bus and the pixel electrode 41. More specifically, the additive capacitance bus 42 is overlapped by the pixel electrode 41, and the additive capacitance 42 is formed on the overlapping portion of the gate bus 21 and the pixel electrode 41 as shown by hatched lines in the figure. The additive capacitance bus 24 is formed by depositing the same metal as that of the gate bus 21 simultaneously when the gate bus 21 is patterned.

This example shown in FIG. 18 is constructed so that the same signal is input to the additive capacitance bus 24 as the counter electrode 3. As an electrical circuit the additive capacitance 42 is in parallel with the liquid crystal capacitance of the liquid crystal material 18 sandwiched between the pixel electrode 41 and the glass substrate 2. The existence of the additive capacitance 42 improves the capability to hold the charge of the pixel electrode 41, thereby enhancing the performance of the display device. In this example also, the pixel defects can be corrected in the same manner as described in the above example.

Figure 19:
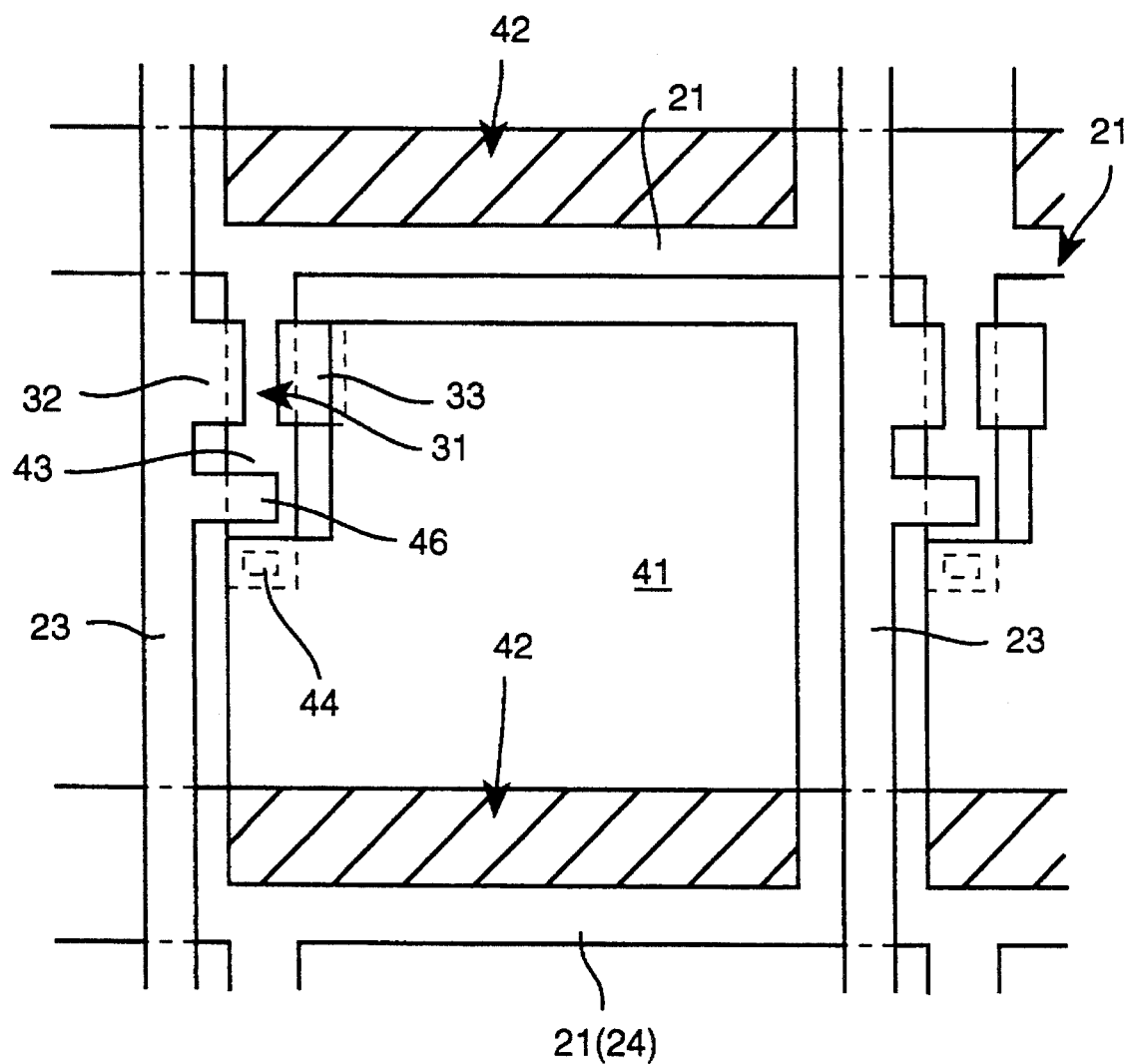
FIG. 19 is a plan view showing a further example of the present invention.

FIG. 19 shows further another example of the present invention in an embodiment similar to that of FIG. 14 in which the additive capacitance 42 is formed on the adjacent gate bus 21. More specifically, the additive capacitance 42 is formed on the overlapping portion of the pixel electrodes 41 and the gate bus 21 through the gate insulating layer 13 as shown by oblique lines in FIG. 19. In this example, when the adjacent gate bus 21 is not selected, the same signal is input to the gate bus 21 as that applied to the counter electrode 3 on the glass substrate 2 using appropriate circuitry (not shown). This gate bus 21 is used as the additive capacitance bus 24. This decreases the light shading area, thereby keeping the display panel from being dark. According to this example, the display performance is further enhanced.

As is evident from the foregoing description, according to the present invention a faulty pixel can be detected after all the pixel electrodes are driven. In addition, the correction of a faulty pixel can be easily done by irradiating the display panel with laser beams from outside the insulating substrates. As a result, the manufacturing yield is increased.

It will be appreciated that various embodiments of an active matrix display device have been described herein. Several configurations have been discussed for enabling the pixel electrode of a faulty pixel to be short-circuited or otherwise connected to an adjacent source bus. Furthermore, several configurations for providing additive capacitance to the pixel electrodes have been discussed. However, the specific configurations discussed herein are intended to be merely exemplary of the various configurations contemplated as being within the scope of the present invention. For example, in another embodiment a pixel electrode $P_{m,n}$ can be short-circuited to the (m+1)th source bus 23 rather than the (m)th source bus 23 using the same concept of a gate bus projection and a source bus projection (in this case from the (m+1)th source bus). In still another embodiment, some other piece of metal or conductive material which is overlapped by both the source bus 23 and the pixel electrode 41 and separated therefrom by an insulating layer can be used to short-circuit the two via laser beams.

It is understood that various other modifications will be apparent to and can be readily made by those skilled in the art without departing from the scope and spirit or this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix display device comprising a first insulating substrate and a second insulating substrate, a gate bus and a source bus arranged on the first insulating substrate in the form of a lattice, a pixel electrode arranged in a segment enclosed by the gate bus and the source bus, a single switching element connected to the pixel electrode, gate bus and the source bus, wherein the source bus includes a projection extending toward the pixel electrode in such a manner as to be electrically disconnected from the pixel electrode, and the gate bus includes a projection extending toward the pixel electrode and having a forward end extending beyond a forward end of the source bus projection, the switching element connected to the pixel electrode being formed at a base portion of the gate bus projection, a middle portion of the gate bus projection being overlaid by the source bus projection with an insulating layer sandwiched therebetween, the gate bus projection being provided with an electroconductive member positioned above the gate bus projection with an intervening insulating layer, the electroconductive member being electrically connected to the pixel electrode.

2. An active display device, comprising:

a plurality of source buses and a plurality of gate buses;

a plurality of pixel electrodes, said pixel electrodes each having associated therewith a single switching element for delivering a drive signal to said pixel electrode from at least one of said source buses as a function of a signal provided by at least one of said gate buses; and means other than said single switching element for selectively and permanently electrically connecting at least one of said pixel electrodes to a corresponding one of said source buses and a projection of a corresponding one of said gate buses when said at least one pixel electrode is defective;

said connecting means including a source bus projection extending from said corresponding source bus and said gate bus projection extending from said corresponding gate bus, said source bus projection and gate bus projection overlapping each other with an insulating layer positioned therebetween, and said gate bus projection also overlapping said at least one pixel electrode with said insulating layer positioned therebetween.

3. The display device of claim 2, said connecting means includes an electrically conductive member positioned proximate to said at least one pixel electrode and said corresponding source bus, projection and wherein said electrically conductive member is selectively electrically joined to said at least one pixel electrode and said corresponding source bus projection and gate bus projection to effect said electrical connection therebetween.

4. The display device of claim 2, wherein said insulating layers are destroyed when said means for electrically connecting selectively connects a pixel electrode and a corresponding source and gate bus so as to provide fused electrical connections in place thereof by the application of heat energy to said insulating layers.

5. The display device of claim 4, wherein said heat energy is provided by laser beams.

6. The display device of claim 2, said plurality of pixel electrodes being arranged in a matrix with one of said source buses positioned between each column of said matrix and one of said gate buses positioned between each row of said matrix.

7. The display device of claim 6, wherein two of said source buses are formed immediately adjacent and on opposite sides of said at least one pixel electrode.

8. The display device of claim 2, further comprising a plurality of additive capacitance buses for providing additive capacitance to said pixel electrodes.

9. The display device of claim 8, said connecting means comprising a source bus projection extending from said corresponding source bus and an additive capacitance bus projection extending from one of said additive capacitance buses, said source bus projection and additive capacitance bus projection overlapping each other with an insulating layer positioned therebetween, and at least one of said source bus projection and said additive capacitance bus projection also overlapping said at least one pixel electrode with another insulating layer positioned therebetween.

10. An active display device, comprising:

a pixel electrode;

a single switching element associated with said pixel electrode for providing a drive signal from a source bus to said pixel electrode as a function of a signal on a gate bus; and means for electrically connecting said pixel electrode to said source bus via a projection from said gate bus with fused connections when said pixel electrode is defective, said connecting means maintaining a permanent electrical connection;

wherein said connecting means includes a source bus projection extending from said source bus and said gate bus projection extending from said gate bus, said source bus projection and gate bus projection overlapping each other with an insulating layer positioned therebetween, and said gate bus projection also overlapping said pixel electrode with said insulating layer positioned therebetween.

11. The display device of claim 10, wherein said insulating layers are destroyed when said pixel electrode is defective so as to provide said fused electrical connections in place thereof by the application of heat energy to said insulation layers.

12. The display device of claim 11, wherein said heat energy is provided by laser beams.

13. An active matrix display device as in claim 1 further comprising an additive capacitance bus arranged on the first substrate for providing additive capacitance to said pixel electrode.

14. An active matrix display device as in claim 1 wherein a part of the pixel electrode is overlaid on the gate bus with an insulating layer therebetween to form an additive capacitance with the gate bus.

* * * * *